United States Patent
Han et al.

(10) Patent No.: US 6,222,169 B1
(45) Date of Patent: Apr. 24, 2001

(54) SURGE-RESISTANT MAGNETRON CIRCUIT FOR USE WITH DC POWER SOURCE

(75) Inventors: Yong-woon Han, Kunpo; Seong-deog Jang; Kwang-seok Kang, both of Suwon; Han-jun Sung, Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/501,631

(22) Filed: Feb. 10, 2000

(30) Foreign Application Priority Data

Sep. 21, 1999 (KR) .................................................. 99-40702

(51) Int. Cl.[7] ...................................................... H05B 6/68
(52) U.S. Cl. ........................... 219/715; 219/702; 363/21; 363/131; 361/2; 361/118
(58) Field of Search .................................. 219/715, 716, 219/702; 363/131, 20, 21; 361/2, 3, 118

(56) References Cited

U.S. PATENT DOCUMENTS

| | | | |
|---|---|---|---|
| 4,593,167 | * | 6/1986 | Nilssen .................................. 219/715 |
| 4,667,075 | * | 5/1987 | Sakurai ................................. 219/715 |
| 4,704,674 | * | 11/1987 | Maehara et al. ....................... 363/131 |
| 4,933,830 | * | 6/1990 | Sato et al. .............................. 363/131 |
| 5,003,141 | * | 3/1991 | Braunisch et al. ..................... 219/716 |

FOREIGN PATENT DOCUMENTS

| | | |
|---|---|---|
| GB 1 004 433 | 9/1965 | (GB) . |
| GB 1 491 455 | 11/1977 | (GB) . |
| GB 2 199 998 | 7/1988 | (GB) . |

* cited by examiner

*Primary Examiner*—Philip H. Leung
(74) *Attorney, Agent, or Firm*—Robert E. Bushnell, Esq.

(57) ABSTRACT

A magnetron driving circuit has a DC/AC conversion section, a transformer, and a capacitor. The DC/AC conversion section converts a direct current inputted from a direct current power source into an alternating current, and outputs the alternating current. The transformer has a primary coil and a secondary coil. The transformer raises a voltage of the alternating current outputted from the DC/AC conversion section and then induces the raised voltage from the primary coil to the secondary coil. The capacitor forms an inductance/capacitance resonance circuit by being connected in parallel with the secondary coil. Thus, in the magnetron driving circuit driven by the direct current power source, since the capacitor with a small capacitance is connected in parallel with the secondary coil of the transformer, the reverse surge voltage induced at the primary coil of the transformer is decreased sharply.

12 Claims, 3 Drawing Sheets

SURGE-RESISTANT MAGNETRON CIRCUIT FOR USE WITH DC POWER SOURCE

CLAIM OF PRIORITY

This application makes reference to, incorporates the same herein, and claims all benefits accruing under 35 U.S.C. §§119 from an application for Magnetron driving Circuit for an AC/DC Microwave Oven earlier filed in the Korean Industrial Property Office on Sep. 21, 1999 and there duly assigned Serial No. 1999-40702.

BACKGROUND OF THE INVENTION

1. Field of the Invention

The present invention relates to a magnetron driving circuit, and more particularly to a magnetron driving circuit capable of preventing the production of a reverse surge voltage during a supply of direct current power.

2. Description of the Related Art

Generally, a microwave oven is a device for cooking food by using microwaves, and has a high voltage transformer (hereinafter called HVT), and a magnetron MGT. The HVT steps up the normal voltage into the higher voltage, and the magnetron MGT is driven by the higher voltage to generate the microwaves of a certain frequency.

Meanwhile, such a microwave oven is designed to be driven by alternating current (hereinafter called AC), and can not be used in the places such as the outdoors, vehicles such as ship, airplane, etc., where the AC is not available. In order to solve such a shortcoming of the microwave oven, an inverter is used to convert the direct current (hereinafter called DC) into the AC for using the microwave oven in the place where the AC is not available.

The AC generated by the inverter is stepped up by the HVT to drive the magnetron MGT. Here, when the DC voltage is converted into the AC power and is outputted by the inverter, there occurs a reverse surge voltage induced at a primary part of the HVT from a secondary part of the HVT, which generates a spark at the inverter. For example, before the high voltage capacitor (hereinafter called HVC) at the secondary part of the HVT is charged, the secondary side circuit forms the short circuit and the reverse surge voltage occurs at the primary coil, resulting in a spark at the inverter. Further, after the HVC is charged, the energy of the secondary coil is reversely induced to the primary coil every half-period, again resulting in the spark at the inverter due to the energy reversely induced.

Hereinafter, the construction, operation, and problems of the inverter driven by the DC power and a magnetron driving part connected with the inverter will be briefly described as a related art.

There are various types of invertors such as the inverter using a relay, and the inverter using semiconductor devices, etc. The same applicant has disclosed a non-directional frequency generator (hereinafter called NDFG), which is an improved version of the inverter, in the Korean Patent Application, and here, the construction, operation, and the shortcomings of the NDFG and the magnetron driving section connected thereto will be described.

The NDFG converts the DC power into the AC power source by using rotatable AC converting means, and is disclosed in the Korean Patent Applications Nos. 98-18589 (filed May 22, 1998), and 98-21117 (filed Jun. 8, 1998) which have not been opened to the public yet.

FIG. 1 is a circuit diagram for showing the NDFG driven by the DC power and the magnetron driving part connected thereto according to the related art of the present invention. Referring to FIG. 1, the NDFG 100 includes a motor 110 driven by the DC for generating rotational force, a commutator 130 rotated by the motor 110, and a plurality of brushes such as first, second, third, and fourth brushes 121–124 as shown in FIG. 1, which are in contact with the outer circumference of the commutator 130. The commutator 130 includes a conductive part which is divided into at least two parts 132a and 132b as shown in FIG. 1, but into an even number of parts. The conductive parts 132a and 132b have an insulating part 133 of a certain width formed therebetween. The conductive parts 132a and 132b are in simultaneous contact with at least two neighboring brushes 121–124. The DC is applied to the input sides of the first to fourth brushes 121–124, while the output sides of the first to fourth brushes 121–124 are connected with a high voltage transformer (hereinafter called HVT). The first and second relays $RY_1$ and $RY_2$ switch on/off the operation of the NDFG 100.

The operation of the NDFG 100 is as follows: The first and second relays $RY_1$ and $RY_2$ are in on-state, and the commutator 130 is rotated by the DC. Accordingly, the brushes 121–124 in contact with the commutator 130 come in contact with the conductive part 132a, the insulating part 133, the conductive part 132b, and the insulating part 133 which are formed on the outer circumference of the commutator 130, sequentially.

More specifically, as the first brush 121 on the upper side of the commutator 130 comes in contact with the conductive part 132a, the electric current from the positive (+) terminal of the DC power source is inputted into the first brush 121, and flows through the conductive part 132a of the commutator 130 and the fourth brush 124, and to the upper portion of the primary coil 202 of the HVT downwardly to the lower portion of the primary coil 202 of the HVT. Then, the electric current is inputted into the second brush 122, and circulates through the conductive part 132b, the third brush 123, and to the negative (−) terminal of the DC power source.

Next, as the commutator 130 is further rotated and as the first brush 121 accordingly comes in contact with the insulating part 133, the electric current does not flow through the commutator 130.

Then as the commutator 130 is further rotated to 90°, the electric current from the positive (+) terminal of the DC power source is inputted into the first brush 121, flows through the conductive part 132b of the commutator 130 and the second brush 122, reverses its direction, and flows from the lower portion of the primary coil 202 of the HVT to the upper portion of the primary coil 202 of the HVT. Then, the electric current is inputted into the fourth brush 124, flows through the conductive part 132a, and the third brush 123, and then circulates to the negative (−) terminal of the DC power source.

By the constant rotation of the commutator 130 of the NDFG, the AC is generated at the primary coil 202 of the HVT in a manner as described above, then the AC is transmitted to a secondary coil of the HVT through the primary coil 202 thereof. Then, the HVT converts the normal voltage into a higher voltage, and the magnetron MGT is driven by the higher voltage converted by the HVT.

When the magnetron is driven, there occurs a problem that the secondary circuit forms a short circuit until the high voltage capacitor HVC of the secondary part of the HVT is charged. That is, when the AC induced from the NDFG 100 is applied to the HVT, the high voltage capacitor HVC connected to the secondary coil of the HVT is shorted instantaneously, and thus a reverse surge voltage occurs in the primary coil. Nearly infinite inrush current due to the reverse surge voltage generates a spark between the brushes and the commutator of the NDFG 100.

Furthermore, even after the high voltage capacitor HVC is normally charged, there occurs another problem that the electric energy of the secondary coil is induced reversely to the primary coil every half period. The reversely induced electric energy generates a spark between the brushes and the commutator of the NDFG 100.

Meanwhile, the problems do not only occur between the magnetron driving part and the NDFG driven by the DC, rather they occur between the magnetron driving part and the inverter in a broad sense for inverting the DC to the AC, including the NDFG.

SUMMARY OF THE INVENTION

The present invention has been developed to overcome the above ploblems of the related art, and accordingly it is an object of the present invention to provide a magnetron driving circuit capable of preventing a reverse surge voltage when driven by DC.

The above object is accomplished by a magnetron driving circuit according to the present invention, including: DC/AC conversion section for converting direct current inputted from a direct current power source into alternating current, and for outputting the alternating current; a transformer having a primary coil and a secondary coil, for raising the voltage of the alternating current outputted from DC/AC conversion section and then inducing the raised voltage from the primary coil to the secondary coil; and a capacitor connected in paralled with the secondary coil for forming an inductance/capacitance resonance circuit 1.

The transformer comprises a high voltage transformer.

The DC/AC conversion section includes a non-directional frequency generator.

The DC/AC conversion section includes a voltage/frequency conversion part for generating a voltage pulse with a predetermined frequency corresponding to an input voltage from a direct current power source; and a push-pull circuit for inverting the direction of the current corresponding to the voltage pulse and thereby for outputting alternating current.

The push-pull circuit inverts the direction of the current by alternately turning on or off the field effect transistors corresponding to the voltage pulse.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREPARED EMBODIMENTS

Figure 1:
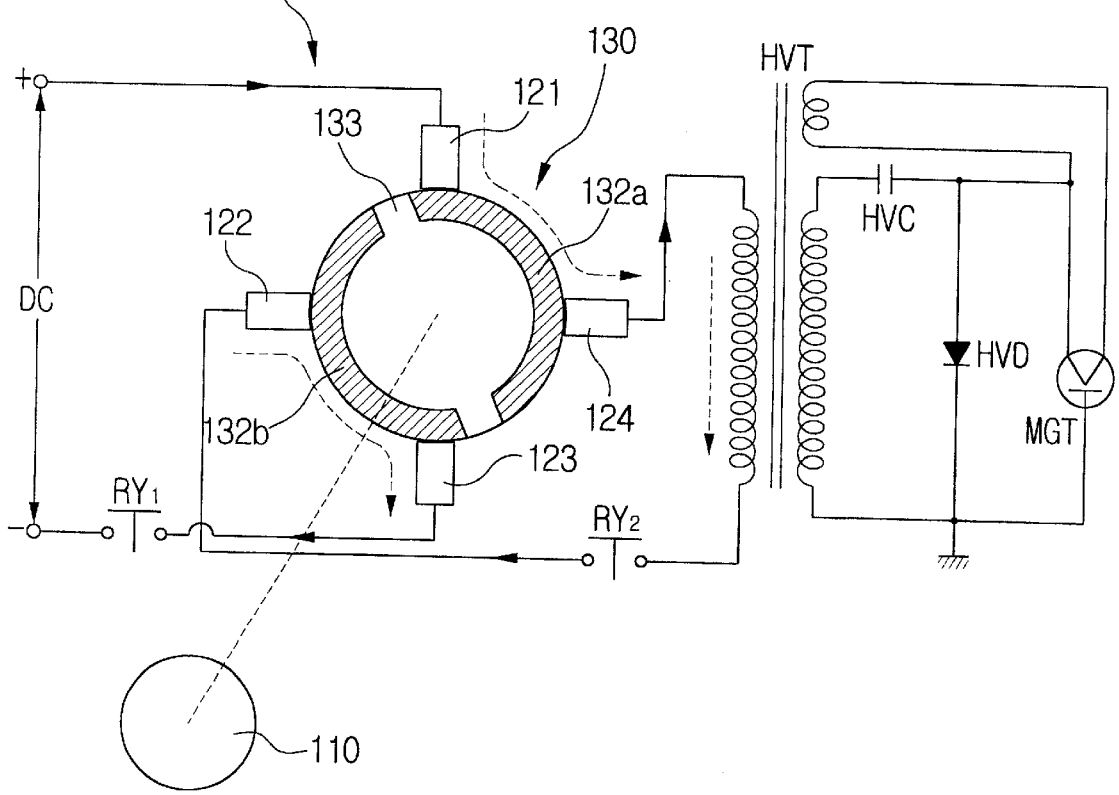
FIG. 1 is a circuit diagram for showing a non-directional frequency generator and a magnetron driving section connected thereto according to the related art.

Hereinafter, the prepared embodiments of the present invention will be described in greater detail with reference to the accompanied drawings, while the same elements are referred to by the same reference numerals throughout. Embodiment 1 is the case of applying an NDFG designed by this applicant as an inverter for converting the DC to AC. Embodiment 2 is the case of applying an inverter operated by a push-pull circuit as an inverter for converting the DC to AC.

Embodiment 1

Figure 2:
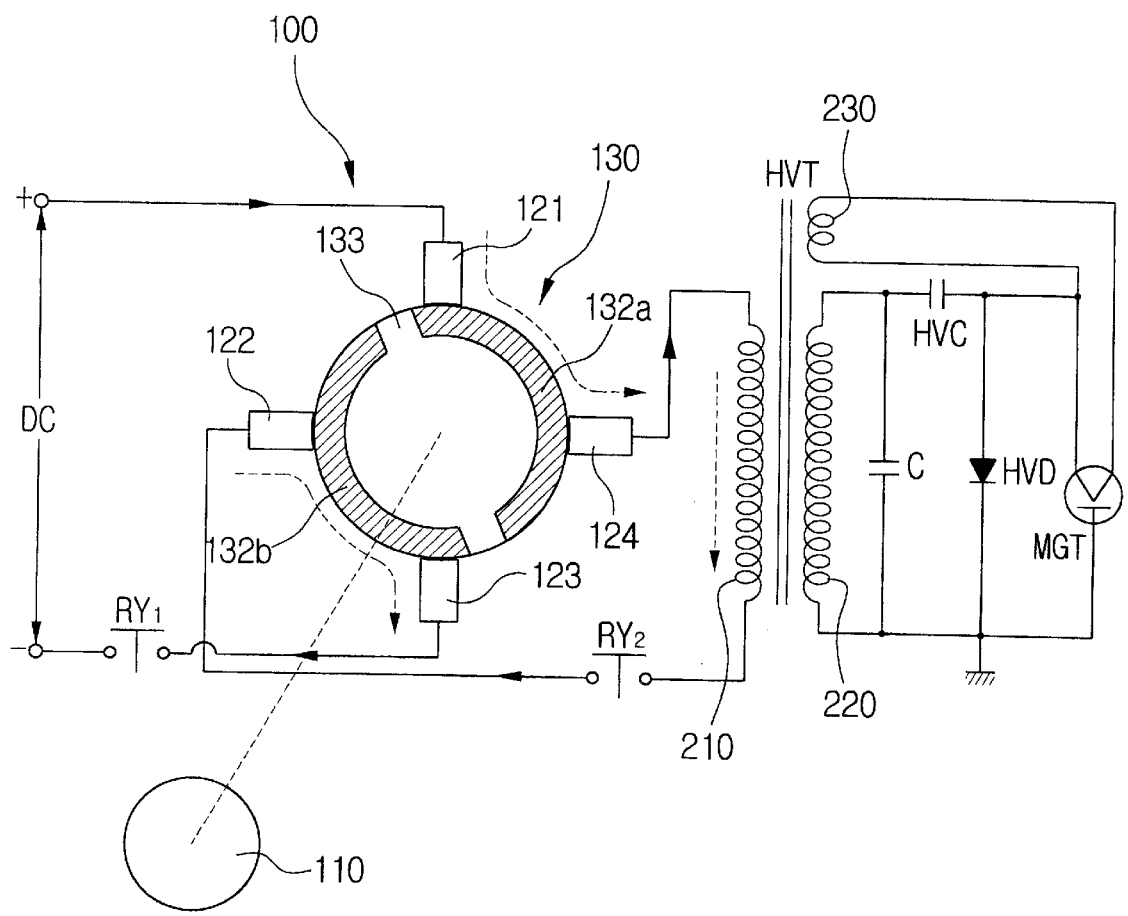
FIG. 2 is a circuit diagram for showing a non-directional frequency generator and a magnetron driving section connected thereto according to a preferred embodiment of the present invention.

FIG. 2 is a circuit diagram for showing the non-directional frequency generator and the magnetron driving section connected thereto according to a preferred embodiment of the present invention.

Referring to FIG. 2, the non-directional frequency generator 100 (hereinafter called NDFG) has a motor 110 driven by direct current power to generate a rotational force, a commutator 130 rotated by the motor 110, a plurality of brushes being in contact with the circumference of the commutator 130, e.g., first, second, third, and fourth brushes 121–124.

The commutator 130 has a cylindrical body rotated by the motor 110, and a conductive part divided into at least two sub-parts 132a and 132b at the outer surface of the cylindrical body, and an insulating part 133 formed with a predetermined width between the two sub-parts 132a and 132b at the outer surface of the cylindrical body.

The two neighboring brushes of the four brushes 121–124 are in simultaneous contact with any one of the conductive sub-parts 132a and 132b of the commutator 130.

The DC power is applied to input sides of the four brushes 121–124, while output sides of the brushes 121–124 are connected with a high voltage transformer (hereinafter called HVT). First and second relays RY1 and RY2 turn on or off the operation of the NDFG 100.

When the commutator 130 of the NDFG 100 is rotated by DC power, the brushes come in contact with different points of the circumference of the commutator 130 due to the rotation of the commutator 130, and thereby the NDFG 100 outputs the AC.

A high voltage transformer HVT is installed for raising the voltage of the AC from the NDFG 100 into a high voltage enough to drive the magnetron MGT.

The high voltage transformer HVT has a primary coil 210 for inputting the AC induced from the NDFG 100, a secondary coil 220 for inducing a high voltage to drive the magnetron MGT, and a filament coil 230 for supplying a filament energy to drive the magnetron MGT.

The secondary coil 220 is connected with a high voltage capacitor HVC, a high voltage diode HVD, and the magnetron MGT.

A resonance capacitor C is connected in parallel with both ends of the secondary coil of the high voltage transformer HVT to form an inductance/capacitance (LC) resonance circuit. It is desirable that the capacitance of the resonance capacitor C is selected to be smaller than that of the high voltage capacitor HVC, e.g., ⅓ of that of the high voltage capacitor HVC.

The operation of the magnetron driving circuit shown in FIG. 2 is described as follows:

That is, the AC is generated due to the operation of the NDFG 100, and the AC is transferred to the secondary coil 220 and the filament coil 230 via the primary coil 210. The high voltage being sufficient to drive the magnetron MGT is induced by the secondary coil 220, and the filament energy induced by the filament coil 230 for driving the magnetron MGT is supplied to the magnetron MGT, and thus the magnetron MGT can be driven.

At this time, since the resonance capacitor C is connected in parallel with both ends of the secondary coil 220, the electric energy of the secondary part is put into the LC resonance circuit formed by the inductance of the secondary coil and the capacitance of the resonance capacitor C. Thus, the electric energy of the secondary coil can be prevented from being induced to the primary coil.

Even before the high voltage capacitor HVC is charged, since the capacitance of the resonance capacitor C is smaller than that of the high voltage capacitor HVC, a small amount of inrush current flows, since the smaller the capacitance of the capacitor becomes, the smaller amount of the current flows at the same voltage. It is desirable that the capacitance of the resonance capacitor C is smaller than ⅓ of that of the high voltage capacitor HVC.

When the effect of the resonance capacitor for preventing the energy from being induced from the secondary coil to the primary coil and the effect of the resonance capacitor for making a small amount of inrush current flow are all considered, it is desirable that the capacitance of the resonance capacitor C is ⅓ of that of the high voltage capacitor HVC.

Embodiment 2

Figure 3:
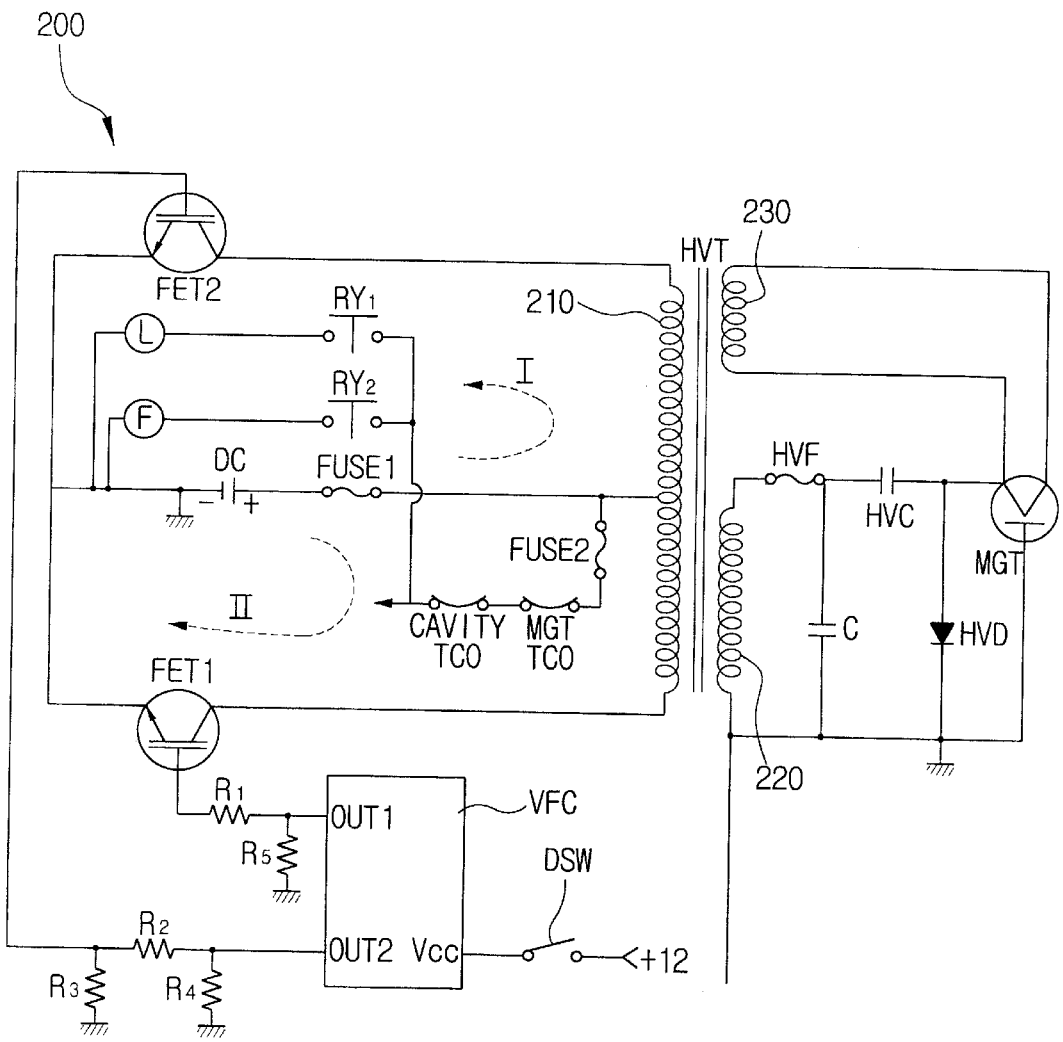
FIG. 3 is a circuit diagram for showing an inverter using a push-pull circuit and a magnetron driving section connected thereto according to another preferred embodiment of the present invention.

FIG. 3 is a circuit diagram for showing an inverter using a push-pull circuit and a magnetron driving section connected thereto according to another preferred embodiment of the present invention. Embodiment 2 applies an inverter operated by a push-pull circuit instead of the NDFG as an inverter for converting the DC to AC.

Referring to FIG. 3, the reference characters DSW denotes a door switch of the microwave oven, and VFC denotes a voltage/frequency converter. An inverter using the push-pull circuit 200 is connected with the voltage/frequency converter VFC and the push-pull circuit inverts the direction of the current by alternately turning on or off field effect transistors FET1 and FET2. The inverter 200 is connected to the DC power source such as a battery and thus converts the DC into AC to output the AC.

A high voltage transformer HVT is installed for raising the voltage of the AC from the inverter 200 into a high voltage enough to drive the magnetron MGT.

The high voltage transformer HVT has a primary coil 210 for inputting the AC applied from the inverter 200, a secondary coil 220 for inducing a high voltage to drive the magnetron MGT, and a filament coil 230 for supplying filament energy to drive the magnetron MGT.

The secondary coil 220 is connected with a high voltage capacitor HVC, a high voltage diode HVD, and the magnetron MGT.

A resonance capacitor C is connected in parallel with both ends of the secondary coil of the high voltage transformer HVT to form an inductance/capacitance (LC) resonance circuit. It is desirable that a capacitance of the resonance capacitor C is selected to be smaller than that of the high voltage capacitor HVC, e.g., ⅓ of that of the high voltage capacitor HVC.

The operation of the magnetron driving circuit shown in FIG. 3 is described as follows:

That is, when the door of the microwave oven is closed or opened, the door switch DSW is turned on or off, respectively.

When the door switch DSW is turned on, the operating power from the DC power source is supplied to the voltage/frequency converter VFC. The voltage/frequency converter VFC comes to generate a voltage pulse with a predetermined frequency correspondingly to an input voltage from the DC power source. The voltage pulse with the predetermined frequency is supplied to the field effect transistors FET1 and FET2. Thus, the field effect transistors FET1 and FET2 are turned on or off alternately.

When the DC power source such as a battery of a vehicle is applied to the primary coil of the high voltage transformer HVT, the directions of the applied currents are indicated as the arrows shown in the dotted lines.

The AC is generated due to the operation of the inverter 200, and is transferred to the secondary coil 220 and the filament coil 230 via the primary coil 210. The high voltage enough to drive the magnetron MGT is induced by the secondary coil 220, and the filament energy induced by the filament coil 230 for driving the magnetron MGT is supplied to the magnetron MGT, and thus the magnetron MGT can be driven.

At this time, since the resonance capacitor C is connected in parallel with both ends of the secondary coil 220, the electric energy of the secondary part is put into the LC resonance circuit formed by the inductance of the secondary coil and the capacitance of the resonance capacitor C. Thus, the electric energy of the secondary coil can be prevented from being induced to the primary coil.

Even before the high voltage capacitor HVC is charged, since the capacitance of the resonance capacitor C is smaller than that of the high voltage capacitor HVC, a small amount of inrush current flows, since the smaller the capacitance of the capacitor becomes, the smaller amount of the current flows at the same voltage. It is desirable that the capacitance of the resonance capacitor C is smaller than ⅓ of that of the high voltage capacitor HVC.

When the effect of the resonance capacitor for preventing the energy from being induced from the secondary coil to the primary coil and the effect of the resonance capacitor for making a small amount of inrush current flow are all considered, it is desirable that the capacitance of the resonance capacitor C is ⅓ of that of the high voltage capacitor HVC.

As described above, in the magnetron driving circuits according to the preferred embodiments of the present invention, the resonance capacitor C is connected in parallel with the secondary coil of the high voltage transformer, in which the capacitance of the resonance capacitor C is smaller than that of the high voltage capacitor HVC. Due to the resonance capacitor C, the electric energy of the secondary part can be put into the LC resonance circuit formed by the inductance of the secondary coil and the capacitance of the resonance capacitor C. Thus, in the magnetron driving circuit driven by the DC power source, the reverse surge voltage induced at the primary coil of the high voltage transformer HVT is decreased sharply. Thereby, the spark generated at the inverter due to the reverse surge voltage can be prevented.

Furthermore, even before the high voltage capacitor HVC is normally charged, since a capacitance of the resonance capacitor is selected to be smaller than that of the high voltage capacitor, a small amount of inrush current flows. Therefore, the spark generated at the inverter can be prevented.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A surge-resistant magnetron driving circuit for use with a direct current (DC) power source, said circuit comprising:
   a DC/AC conversion module for converting a DC power source into an alternating current (AC) power source, to provide AC power at an output of the module, said module comprising a surge-resisting means for limiting reverse surge voltage and sparking;
   connected to the output of the conversion module, a transformer having a primary coil and a secondary coil, said transformer adapted for raising the voltage of the AC power from the conversion module to provide AC power at a raised voltage at an output of the secondary coil; and
   a capacitor connected in parallel with the secondary coil for forming an inductance/capacitance resonance circuit.

2. The magnetron driving circuit of claim 1, wherein the surge-resisting means comprises a non-directional frequency generator (NDFG).

3. The magnetron driving circuit of claim 1, wherein the surge-resisting means comprises:
   a voltage/frequency conversion module for generating a voltage pulse with a predetermined frequency corresponding to an input voltage from the DC power source; and
   a push-pull circuit for inverting a direction of a current flow within the conversion module, said direction corresponding to the voltage pulse, whereby AC power is provided at the output of the conversion module.

4. The magnetron driving circuit of claim 3, wherein the push-pull circuit inverts the direction of the current by alternately turning on and off field effect transistors in response to the voltage pulse.

5. The magnetron driving circuit of claim 1, wherein the output of the secondary coil is connected to an input of a rectifier circuit via a high voltage capacitor (HVC), said HVC having a capacitance no more than about three times that of the capacitor connected in parallel with the secondary coil.

6. The magnetron driving circuit of claim 1, said circuit adapted for operation of a microwave oven in field use where AC power is unavailable, by connection of said circuit to a vehicle battery as a DC power source.

7. A method of providing AC power for use in driving a microwave oven magnetron in a location where only DC power is available, said method comprising the steps of:
   (1) providing a DC/AC conversion module for converting a DC power source into an alternating current (AC) power source, to provide AC power at an output of the module, said module comprising a surge-resisting means for limiting reverse surge voltage and sparking;
   (2) connecting to the output of the conversion module, a transformer having a primary coil and a secondary coil, said transformer adapted for raising the voltage of the AC power from the conversion module to provide AC power at a raised voltage at an output of the secondary coil; and
   (3) connecting a capacitor in parallel with the secondary coil to form an inductance/capacitance resonance circuit.

8. The method of claim 7, wherein the surge-resisting means comprises a non-directional frequency generator (NDFG).

9. The method of claim 7, wherein the surge-resisting means comprises:
   a voltage/frequency conversion module for generating a voltage pulse with a predetermined frequency corresponding to an input voltage from the DC power source; and
   a push-pull circuit for inverting a direction of a current flow within the conversion module, said direction corresponding to the voltage pulse, whereby AC power is provided at the output of the conversion module.

10. The method of claim 9, wherein the push-pull circuit inverts the direction of the current by alternately turning on and off field effect transistors in response to the voltage pulse.

11. The method of claim 7, comprising a further step of connecting the output of the secondary coil to an input of a rectifier circuit via a high voltage capacitor (HVC), said HVC having a capacitance no more than about three times that of the capacitor connected in parallel with the secondary coil.

12. The method of claim 7 comprising a further step in which the DC/AC conversion module is connected to a vehicle battery as a DC power source.

* * * * *